United States Patent Office 2,876,251
Patented Mar. 3, 1959

2,876,251 p-CARBOMETHOXY-N-NITROSO-N-METHYLBENZAMIDE

Robert E. Barnhart, Hedgesville, W. Va., and Willard E. Catlin, Woodstown, N. J., assignors to E. I. du Pont de Nemours and Company, Wilmington, Del., a corporation of Delaware No Drawing. Application September 14, 1956
Serial No. 609,822

1 Claim. (Cl. 260—471)

The present invention pertains to a new chemical compound. More particularly, the present invention relates to p-carbomethoxy N-nitroso, N-methyl benzamide and to processes for making and using same.

It is an object of the present invention to prepare p-carbomethoxy N-nitroso, N-methyl benzamide and to provide a convenient process for this purpose. Other and additional objects will become apparent from a consideration of the ensuing specification and claim.

p-Carbomethoxy-N-nitroso-N-methylbenzamide (hereinafter referred to as "p-CNMB"), which may be represented by the following formula:

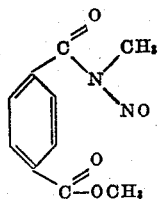

is prepared, according to our invention, by treating a nitric acid solution of p-carbomethoxy N-methyl benzamide with an inorganic nitrate. The p-carbomethoxy N-methyl benzamide may be prepared from the corresponding acid chloride by treatment with methylamine which, in turn, is obtained by the reaction of thionyl chloride with methyl hydrogen terephthalate in the presence of a triethylamine catalyst. Methyl hydrogen terephthalate may be prepared in the well-known manner from dimethyl terephthalate and alcoholic KOH as set forth, for example, in Beilstein (Hauptwerk), vol. 9, p. 843. The following example illustrates the preparation of the new compound:

*Example 1*

To 60 grams of methyl hydrogen terephthalate was added 150 cc. of thionyl chloride and 1 cc. of triethylamine catalyst. The mixture was heated at reflux for one hour after all the solids had disappeared into the solution. The excess thionyl chloride was removed, and 71 grams of p-carbomethoxy benzoyl chloride solidified and was recovered. 35 grams of the latter was dissolved in 250 cc. of dry ether and the mixture was filtered. Methyl amine in dry ether was added slowly in excess to the filtrate. The mixture was filtered, washed, and dried. This procedure was repeated. A total of 70 grams of p-carbomethoxy N-methyl benzamide was obtained. To a solution of 35 grams of the latter in 200 cc. of nitric acid and 100 cc. of water was added 35 grams of sodium nitrite in 70 cc. of water. The temperature was not allowed to rise above 20° C. The mixture was agitated for two hours, then drowned in 2 liters of ice water, filtered, washed, and dried. The remaining 35 grams of the p-carbomethoxy N-methyl benzamide was subjected to the identical treatment and the dry products were combined giving a total yield of 51 grams of solid material which was identified as p-CNMB.

The new compound is useful as a blowing agent for the preparation of expanded cellular polyvinyl chloride materials as illustrated by the following example:

*Example 2*

A plastisol was prepared by stirring together the following ingredients:

| | Parts |
|---|---|
| Plastisol grade polyvinyl chloride | 100 |
| "Glyptal" 2557 [1] (plasticizer) | 100 |
| Basic lead carbonate | 5 |
| N-methyl N-nitroso p-carbomethoxy-benzamide | 7 |

[1] A polyadipate manufactured by the General Electric Company.

The plastisol was poured into an aluminum cup, 2½ inches in diameter and 2 inches deep, to a depth of ⅛ inch, and heated in an oven at 100° C. until it turned white. It was then transferred to an oven at 155° C. and heated an additional 40 minutes. The product was a white sponge having a medium-fine cell structure and a volume 8 times that of the original composition.

In Example 2, any conventional monomeric plasticizer, such as di-2-ethylhexyl phthalate, may be used in lieu of the "Glyptal" 2557.

The new compound is a light yellow crystalline solid at room temperature.

Our new compound, a novel method for its preparation, and its primary use have been disclosed in the foregoing specification. We intend to be limited only by the following claim:

p-Carbomethoxy-N-nitroso-N-methylbenzamide.

References Cited in the file of this patent

UNITED STATES PATENTS

| | | |
|---|---|---|
| 2,264,358 | Bock | Dec. 2, 1941 |
| 2,350,826 | Salvin et al. | June 6, 1944 |
| 2,588,885 | Schlessinger | Mar. 11, 1952 |
| 2,673,220 | Hunter | Mar. 23, 1954 |
| 2,754,326 | Bradley et al. | July 10, 1956 |
| 2,776,265 | Fuller | Jan. 1, 1957 |

UNITED STATES PATENT OFFICE

CERTIFICATE OF CORRECTION

Patent No. 2,876,251                      March 3, 1959

Robert E. Barnhart et al.

It is hereby certified that error appears in the printed specification of the above numbered patent requiring correction and that the said Letters Patent should read as corrected below.

Column 1, line 39, for "nitrate" read -- nitrite --.

Signed and sealed this 16th day of June 1959.

(SEAL)
Attest:

KARL H. AXLINE
Attesting Officer

ROBERT C. WATSON
Commissioner of Patents